2,700,036

FRACTIONATION OF FATTY ACID GLYCERIDES

Theodore F. Bradley, Orinda, Albert C. Mueller, Berkeley, and Edward C. Shokal, Walnut Creek, Calif., assignors to Shell Development Company, San Francisco, Calif., a corporation of Delaware No Drawing. Application March 13, 1950,
Serial No. 149,452

11 Claims. (Cl. 260—96.5)

This invention is concerned with a new process for fractionating mixtures of certain polar organic compounds. Specifically, it is concerned with the fractionation of mixtures of monoesters formed between polyhydric alcohols and fatty acids.

Monoglycerides of higher fatty acids having drying characteristics are utilized in alkyd resin manufacture. Many mixtures of glycerides which are available contain only a minor amount of glycerides having drying characteristics and, consequently, these mixtures have not been available for use in alkyd resin manufacture or for other purposes requiring the same characteristics.

Several processes have been proposed for the fractionation of natural oils such as animal and vegetable oils. These are principally based upon solvent extraction or fractional crystallization. While these processes are adequate in many instances, they are expensive to operate and require elaborate equipment. One process which has been proposed for the fractionation of fatty acids and of esters of fatty acids with monohydric alcohols comprises the contacting of a mixture of said acids or esters with a complex-forming agent such as urea. The theory upon which complex formation was based briefly comprised the supposition that urea forms a loose molecular complex with straight-chain materials and most easily forms such complex with straight-chain saturated materials. As the degree of branching or of unsaturation increased, the difficulty of complex formation with urea likewise increased. In fact, it was believed that esters of polyhydric alcohols did not form complexes with urea regardless of their degree of saturation.

This original conclusion was based upon tests made with the esters as they are found to exist in natural condition. Naturally occurring esters found, for example, in soya bean oil or in salmon oil, are present as triglycerides. They have, in effect, a branched structure, even though glycerine and fatty acid components by themselves are substantially straight-chained members. It was believed necessary, therefore, to hydrolyze the triglycerides forming the free acids or the esters of monohydric alcohol such as methyl or ethyl esters. These mixtures of acids or monohydric alcohol esters were then treated with urea and it was found that the members of the mixture having the greatest degree of saturation formed urea complexes, while the more highly unsaturated materials, such as linolenic acid or methyl linolenate, did not form a molecular complex, or at most did so only in a pure state or at low temperatures.

It is an object of the present invention to provide a process for the fractionation of a mixture of monoesters of polyhydric alcohols and fatty acids, said mixture comprising monoesters of fatty acids having varying degrees of unsaturation. It is another object of the present invention to provide a process for improving the drying oils from natural products for use in alkyd resin manufacture. Other objects will become apparent during the following discussion.

Now, in accordance with this invention, it has been found that crystalline complexes are formed between urea and monoglycerides of fatty acids having less than two olefinic bonds. Still in accordance with this invention, a process has been found for improving the drying power of a mixture of monoglycerides of naturally occurring fatty acids. Briefly, this process comprises contacting the mixture of monoglycerides having varying degrees of saturation with urea to form a mixture of crystalline complexes with a relatively more saturated fatty acid monoglyceride fraction leaving a fraction comprising the relatively less saturated fatty acid monoglycerides. It will be understood that while the discussion mainly is concerned with monoglyceride fractionation, the process has been found applicable to monoesters of other polyhydric alcohols as enumerated hereinafter.

The starting material in most cases comprises vegetable oils or animal oils such as soya bean, cotton seed, linseed, cocoanut, perilla and hempseed oils, as well as oiticica and tung oils; fish oils such as sardine, menhaden, whale oil and fish liver oils also provide suitable mixtures for use in the present process. Other suitable mixtures comprise isomerized linseed oil and soya bean oils, as well as dehydrated castor oil. The compositions of these various types of natural products are well-known. They comprise principally mixtures of triglycerides of higher fatty acids having varying degrees of saturation such as stearic, palmitic, oleic, linolenic, linoleic and arachidic acids. The principal object in the present case is to concentrate the fraction of these natural mixtures containing two or more olefinic linkages, since they have been found to have the best drying characteristics.

Methods for the conversion of these naturally occurring mixtures of triglycerides to mixtures of monoglycerides are well-known in the art. The best known methods comprise treatment of the triglycerides with an excess amount of glycerol in the absence of a catalyst or the catalytic conversion of triglycerides to monoglycerides by heating the triglycerides and glycerol in the presence of catalysts such as sodium carbonate. If the free acids are available, a third method for monoglyceride formation comprises the direct esterification of the fatty acids with a suitable amount of glycerine.

When the monoglycerides have been formed, they are then treated with urea to effect the fractionation discussed in detail hereinafter. The operating conditions for treatment with urea consist of treatment at temperatures between about 0° C. and 75° C. for a time which will usually vary between 15 minutes and 8 hours. Preferably, the treatment temperature is between 15° C. and 45° C. and the time of treatment is between one-half and 3 hours. The most convenient method for carrying out the present process comprises treatment of the mixture in the presence of a common solvent which is preferably a polar solvent such as lower primary alcohol. Methyl alcohol is preferred for this purpose, since it has been found to be an excellent solvent not only for the monoglycerides, but also for urea at the temperatures of treatment. Other solvents or diluents may be present such as minor amounts of water, or ketones such as methyl ethyl ketone or methyl isobutyl ketone. If a multiphase system is desired, aqueous alcoholic urea may be employed while the monoglyceride is dissolved in a solvent which is immiscible with aqueous alcohol. Preferably, a solvent to monoglyceride ratio of 1:1 to 4:1 has been found to be especially preferred, since it promotes the most favorable conditions for suitable fractionation. Ratios within this range favor the formation of large crystals of the complex which separate cleanly from the raffinate and, hence, favor the formation of pure fractions. The term raffinate as used in the present instance will be understood to mean the fraction of the mixture of monoglycerides which does not form crystalline complexes with urea under temperature reaction conditions employed.

Preferably, urea is present as a saturated solution in the reaction mixture and still more preferably, the amount of water present in the reaction mixture is maintained at a minimum. Solid urea may be present if so desired, variations of adsorption tower equipment being utilized in the process. In order to promote maximum complex formation, it is highly desirable to maintain a large excess of urea relative to the amount of monoglycerides and especially relative to the amount of more saturated fractions thereof. As the amount of urea with relation to the monoglyceride mixture is reduced, the extent of reaction decreases, only the most saturated fractions forming crystalline complexes. This leaves as a raffinate a fraction having less than the maximum possible drying characteristics. Hence, the preferred process for producing raffinates having maximum drying power comprises treatment of the mixture of monoglycerides by contacting with a large excess of urea. Since the crystalline complexes roughly comprise slightly less than one mole of urea for each carbon atom in the monoglyceride, the minimum molar ratio of urea to the active fraction of the monoglyceride to produce the maximum amount of complex will be approximately 18 moles of urea for each mole of monoglyceride capable of a complex formation under the conditions of the reaction. However, in order to obtain the most rapid rate of reaction, even larger ratios of urea to active monoglycerides should be employed. The utility of the subject urea complexes is especially evident in that they enable the fractionation of fatty acid glycerides to occur.

The process generally comprises mixing the monoglycerides with urea in a reactor column by means of rapid stirring allowing the mixture to remain in the reactor for a time sufficient to complete the reaction and then transferring the reaction mixture to a separator. The separator may comprise a settling tank, filter or centrifuge, depending upon the exact character of the mixture and the ease with which it may be separated by any one of these means. If a settling tank is employed, the raffinate separates from the crystalline complex and the residual solution of urea which may be in a separate phase or in the same phase with the raffinate, dependent upon any auxiliary solvent which is present.

After removal of the raffinate, the mixture of crystalline complexes may be heated to a temperature of 60° C. to 125° C., preferably in the presence of alcohol or water in order to decompose the complex and regenerate both monoglycerides and urea therefrom.

It has been found, in accordance with the present invention, that the process described permits the concentration of highly unsaturated monoglycerides into the raffinate while the less unsaturated monoglycerides are separated as a urea complex. It cannot be stated definitely at this time that complex formation definitely does not take place with the highly unsaturated monoglycerides, but only that complex formation occurs with greatest ease and at the highest rate with the more saturated fractions of a mixture of monoglycerides containing components of varying degrees of saturation. For the most part, under the conditions described, the monoglycerides whose fatty acid radical contains less than two olefinic bonds have been found to form urea complexes with greatest ease.

The addition of anti-corrosion agents to the reaction mixture has been found especially desirable, since urea solutions tend to promote rapid corrosion of iron equipment and even structures composed of cement. This appears to be caused by catalytic oxidation which is apparently accelerated in the presence of urea. The equipment may be protected by blanketing with an inert gas such as nitrogen or by utilizing from about 0.01% to 2% by weight of the monoglycerides of a corrosion inhibitor such as an organic or inorganic nitrite, ammonium or sodium phosphate, or ammonium or sodium dichromate. Alternatively, the equipment may be coated or lined with resins or corrosion resistant materials such as glass.

While the process of the present invention has been described particularly with reference to mixtures of monoglycerides of naturally occurring fatty acids, the phenomena involved permit its application to the fractionation of other monoesters of polyhydric alcohols such as those of glycols, pentaerythritol, sorbitol and similar polyhydric alcohols such as glycol, trimethylene glycol, hexamethylene glycol, and their homologues and analogues. Preferably, the polyhydric alcohol is one having from 2 to 10 carbon atoms in a straight chain and still more preferably, containing no hydrocarbon side chains. The fatty acids to be combined with the polyhydric alcohols for use in the present invention are preferably the higher fatty acids found in vegetable and animal or fish oils but also may include straight-chain fatty acids from 4 to 50 carbon atoms including butyric, capryllic, myristic and stearic acids, as well as oleic acid, linolenic acid and elaestearic acid.

The following examples illustrate the process of the present invention:

*Example I*

Distilled soya bean oil acids (1.75 moles) were heated with glycerine (3.5 moles) at 200° C. for 3 hours under nitrogen. The mixture contained 0.2% anhydrous sodium carbonate catalyst. The monoglyceride which resulted had an iodine value of 103 and a saponification equivalent of 0.26. Twenty-five parts by weight of the monoglyceride so prepared were diluted with an equal quantity of methyl alcohol. One thousand parts by weight of methyl alcoholic urea solution saturated at 20° C. were added to the diluted monoglycerides. The homogeneous mixture was cooled to 10° C. and allowed to stand at this temperature for one-half hour. Crystalline complexes formed between urea and a fraction of the monoglycerides and were readily filtered at the end of the reaction period. They were washed with methanol and then warmed in the presence of water at 60° C. until the complexes broke down and the monoglycerides separated as an oily layer. The regenerated urea dissolved in the water phase. The iodine value of the recovered extracted fraction was 64 (Wijs). The product had an ester number of 0.34 equivalent per 100 grams.

*Example II*

Distilled soya bean oil, i. e., triglycerides (1 mole) and glycerine (2 moles) was heated with 0.35% anhydrous sodium carbonate for 2 hours at 250° C. and subsequently for an hour at 250° C. to 270° C. under nitrogen atmosphere. The treatment of the resulting monoglyceride mixture with urea was substantially that described in Example I. The extracted monoglyceride fraction and the raffinate monoglyceride fractions so derived had the following characteristics:

|  | Original | Extract | Raffinate |
| --- | --- | --- | --- |
| Iodine No | 106 | 96 | 134 |
| Olefin bonds |  | 1.2 | 1.8 |
| Saponification value [1] | 0.28 | .32 | .29 |
| Acidity [1] | 0.004 | .003 | .013 |

[1] Equivalents per 100 grams.

*Example III*

The procedure described in Example II was repeated using ethyl alcohol as the reaction medium in place of methyl alcohol. The fractionation appeared to be sharper, since the iodine number of the extracted monoglycerides was 72.

An additional feature further enhancing the value of this invention comprises the finding that complex formation with urea occurs more readily with diglycerides than with monoglycerides. Hence, a mixture of monoglycerides and diglycerides having a uniform degree of unsaturation may be fractionated by treatment with urea as described above. The fraction preferentially forming urea complexes contains a preponderance of the diglycerides, while the monoglycerides are concentrated in the raffinate from such an operation. This finding is particularly unexpected since triglycerides are apparently inert toward urea. It would be reasonable to expect the diglycerides to be less reactive than the monoglycerides, whereas the reverse order has actually proved to be true.

A typical separation of this type was carried out as follows:

A mixture of mono- and diglycerides of soy bean fatty acids was formed by esterification of soy bean fatty acids with glycerol. One hundred parts by weight of the mixed glycerides were mixed with 900 parts methanol and 300 parts urea at 40° C. The mixture was cooled to 10° C. The complexes which had been formed were removed by filtration and decomposed by warming in water at 70–80° C. Analysis of the recovered glycerides showed 17% monoglycerides and 83% diglycerides. The raffinate, i. e. the unreactive glycerides contained 85% monoglycerides and 15% diglycerides.

We claim as our invention:
1. A process for the separation of monoglycerides of soya bean oil fatty acids into a fraction A of relatively low iodine number and a fraction B of relatively high iodine number which comprises contacting a methyl alcoholic solution of said mixture with a methyl alcoholic solution of urea at a temperature of 10 to 45° C. for a period of 10 to 300 minutes, whereby fraction A monoglycerides form crystalline complexes with urea and fraction B remains in solution in methyl alcohol, and subsequently separating the solution of fraction B from the crystalline complexes of fraction A.

2. A process for the separation of a mixture of monoglycerides of vegetable oil fatty acids into a fraction A of relatively low iodine number and a fraction B of relatively high iodine number which comprises contacting said mixture with urea in a lower monohydric alcohol solution at a temperature of 10 to 45° C., whereby fraction A monoglycerides form crystalline complexes with urea but fraction B remains in solution, and subsequently separating the solution of fraction B from the crystalline complexes of fraction A.

3. A process according to claim 2 wherein the vegetable oil fatty acids are soya bean oil fatty acids.

4. A process according to claim 2 wherein the lower monohydric alcohol is methyl alcohol.

5. A process for the separation of a mixture of monoesters of polyhydric alcohols with straight chain fatty acids having differing degrees of unsaturation comprising contacting said mixture at a temperature of 0 to 75° C. with urea, whereby crystalline complexes are formed between a fraction A of said mixture, a fraction B of said mixture being inert towards urea under the contacting conditions, separating the resulting crystalline complexes from fraction B and regenerating esters of fraction A from the separated complexes, fraction A being enriched in relatively less unsaturated esters and fraction B being enriched in relatively more unsaturated esters.

6. A process according to claim 5 wherein the mixture of monoglycerides is a mixture of monoglycerides of fish oil acids.

7. A process for the separation of a mixture of monoesters of polyhydric alcohols with straight-chain fatty acids having differing degrees of unsaturation comprising contacting said mixture at a temperature between 0° and 75° C. with urea, whereby crystalline complexes are formed between a fraction A of said mixture, a fraction B of said mixture being inert towards urea under the contacting conditions, and separating the resulting crystalline complexes from fraction B, fraction A being enriched in relatively less unsaturated esters and fraction B being enriched in relatively more unsaturated esters.

8. A process for the separation of a mixture of mono- and diglycerides of soy bean oil fatty acids into a fraction A having the diglycerides concentrated therein and a fraction B having the monoglycerides concentrated therein which comprises contacting a methyl alcoholic solution of said mixture with urea at a temperature between 10° C. and 40° C. for a time sufficient to form crystalline molecular complexes of urea with fraction A, fraction B remaining in solution in methyl alcohol and subsequently separating the solution of fraction B from the crystalline complexes of fraction A.

9. A process for the separation of a mixture of mono- and diglycerides of vegetable oil fatty acids into a fraction A, having the diglycerides concentrated therein and a fraction B having the monoglycerides concentrated therein which comprises contacting said mixture with urea at complex forming temperatures for a time sufficient to form crystalline molecular complexes of urea with fraction A, fraction B remaining unaltered and subsequently separating fraction B from the crystalline complexes of fraction A.

10. A process for the separation of a mixture of mono- and diglycerides of higher fatty acids into a fraction A having the diglycerides concentrated therein and a fraction B having the monoglycerides concentrated therein which comprises contacting a solution of said mixture with urea at a temperature below 75° C. for a time sufficient to form crystalline molecular complexes of urea with fraction A, fraction B remaining in solution and subsequently separating the solution of fraction B from the crystalline complexes of fraction A.

11. A process for the separation of a mixture of mono- and diglycerides of animal oil fatty acids into a fraction A having the diglycerides concentrated therein and a fraction B having the monoglycerides concentrated therein which comprises contacting said mixture with urea at a temperature below about 75° C. for a time sufficient to form crystalline molecular complexes of urea with fraction A, fraction B remaining unaltered and subsequently separating the solution of fraction B from the crystalline complexes of fraction A.

References Cited in the file of this patent

UNITED STATES PATENTS

| 2,520,715 | Fetterly | Aug. 29, 1950 |
| 2,557,257 | Melrose | June 19, 1951 |
| 2,594,481 | Bowman et al. | Apr. 29, 1952 |

OTHER REFERENCES

Jour. Am. Chem. Soc., vol. 72, page 4253 (1950). Article by Redlich et al. (received Jan. 10, 1950).